(12) United States Patent
Lim et al.

(10) Patent No.: US 8,873,928 B2
(45) Date of Patent: Oct. 28, 2014

(54) AUDIO AND VIDEO SYNCHRONIZATION APPARATUS AND METHOD IN WIRELESS COMMUNICATION NETWORK

(75) Inventors: Yong-Hyun Lim, Seoul (KR); Yong-Gyoo Kim, Seoul (KR); Tae-Sung Park, Suwon-si (KR); Sung-Kee Kim, Hwaseong-si (KR); Ji-Wan Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 436 days.

(21) Appl. No.: 12/632,048

(22) Filed: Dec. 7, 2009

(65) Prior Publication Data

US 2010/0142927 A1 Jun. 10, 2010

(30) Foreign Application Priority Data

Dec. 5, 2008 (KR) ........................ 10-2008-0123018

(51) Int. Cl.
*H04N 5/932* (2006.01)
*H04N 21/2368* (2011.01)
*H04N 21/43* (2011.01)
*H04N 21/434* (2011.01)

(52) U.S. Cl.
CPC ....... *H04N 21/2368* (2013.01); *H04N 21/4307* (2013.01); *H04N 21/4341* (2013.01)
USPC .......................................... 386/219; 386/230

(58) Field of Classification Search
None
See application file for complete search history.

(56) References Cited

U.S. PATENT DOCUMENTS

| 2006/0012709 | A1* | 1/2006 | Yamada et al. | 348/515 |
| 2006/0233203 | A1 | 10/2006 | Iwamura | |
| 2007/0006060 | A1* | 1/2007 | Walker | 715/500.1 |
| 2007/0008830 | A1* | 1/2007 | Tsukazaki et al. | 369/1 |
| 2007/0032198 | A1* | 2/2007 | Sakamoto | 455/69 |
| 2007/0073931 | A1* | 3/2007 | Hisamoto | 710/52 |
| 2007/0223884 | A1* | 9/2007 | Lin et al. | 386/96 |

FOREIGN PATENT DOCUMENTS

KR 10-2008-0007577 A 1/2008

* cited by examiner

*Primary Examiner* — William C Vaughn, Jr.
*Assistant Examiner* — Eileen Adams
(74) *Attorney, Agent, or Firm* — Sughrue Mion, PLLC

(57) ABSTRACT

An audio and video synchronization apparatus and method in a wireless communication network are provided. The audio and video synchronization apparatus includes a receiver that receives audio frames and video frames, a playback buffer that sequentially buffers the audio frames, a detector that determines whether the audio frames are synchronized with the video frames and adjusts a playback time of the video frames based on a playback time of the audio frames if it is determined the audio frames are not synchronized with the video frames.

18 Claims, 4 Drawing Sheets

AUDIO AND VIDEO SYNCHRONIZATION APPARATUS AND METHOD IN WIRELESS COMMUNICATION NETWORK

PRIORITY

This application claims priority from Korean Patent Application No. 10-2008-0123018 filed in the Korean Intellectual Property Office on Dec. 5, 2008, the entire disclosure of which is hereby incorporated by reference.

BACKGROUND

1. Field

Apparatuses and methods consistent with embodiments relate generally to synchronization of multimedia data, and more particularly, to synchronization of multimedia data by adjusting video playback when a mobile terminal in a wireless communication network receives multimedia data such as audio and video data and plays back the multimedia data.

2. Description of the Related Art

Generally, a server transmits multimedia data such as audio or video playback data to a mobile terminal using real-time transport protocol (RTP)/real-time transport control protocol (RTCP). The mobile terminal adjusts audio and video synchronization by comparing audio and video time stamps contained in the multimedia data with its own system time.

FIG. 1 is a diagram showing audio and video time stamps generated in a server according to a related art method. Referring to FIG. 1, a server generates time stamps with synchronized audio and video. The time stamps are divided into an audio time stamp and a video time stamp. Audio and video sampling time information obtained based on a system clock of the server is included in the audio and video time stamps, respectively.

The audio and video time stamps including the obtained audio and video sampling time information are transmitted to a mobile terminal. The mobile terminal calculates audio and video playback times by comparing the audio and video time stamps received from the server with its own system clock and plays back audio and video at the respective playback times.

However, such a method may cause an unexpected problem such as audio discontinuities or audio skipping when system clock resolution or audio playback rate of the mobile terminal is not identical to system clock resolution or audio playback rate of the server.

For example, audio frames received by a receiver of the mobile terminal should be transmitted to a playback buffer at a transmission rate which is the same as an audio playback rate. If the transmission rate of the audio frames is lower than the audio playback rate, buffer underflow occurs and thereby an audio discontinuity phenomenon occurs. On the contrary, if the transmission rate of the audio frame is higher than the audio playback rate, the buffer is short of space to store data as time elapses and thereby an audio skipping phenomenon occurs. Although such a problem may be overcome in streaming during an interval less than a prescribed time when a large buffer space is assigned for storage of the audio frames, it is difficult to ensure a large buffer space in an environment of a mobile terminal with limited storage capacity.

FIG. 2 is a diagram illustrating audio and video time stamps received by a mobile terminal from a server according to a related method. Due to a problem in which system clock resolution or audio playback rate of a mobile terminal are not accurately identical to that of a server, audio may be played later than video, or vice versa during playback of audio and video. If such a problem is accumulated, audio and video go out of synchronization.

Typically, if there is slight synchronization mismatch and playback is not performed for a long time (generally greater than three minutes), an audio skipping or discontinuity phenomenon may not occur. However, if playback is performed for a long time in a stable streaming environment, the above-described method may generate audio skipping or discontinuities and audio and video synchronization may not be accurately established. Furthermore, since a usable memory resource of the mobile terminal is limited, a method for adjusting audio and video synchronization using a memory less than a prescribed level is needed.

SUMMARY

One or more exemplary embodiments provide an apparatus and method for adjusting audio and video synchronization which can smoothly play back audio without audio skipping or discontinuities even when system clock resolution or playback rate of a server is different from that of a mobile terminal.

According to an aspect of an exemplary embodiment, there is provided an apparatus for synchronizing audio and video in a wireless communication network, the apparatus including a receiver that receives audio frames and video frames, a playback buffer that sequentially buffers the audio frames, a detector that determines whether the audio frames are synchronized with the video frames and adjusts a playback time of the video frames based on a playback time of the audio frames if it is determined that the audio frames are not synchronized with the video frames.

According to an aspect of another exemplary embodiment, there is provided a method for synchronizing audio and video in a wireless communication network, the method including receiving audio frames and video frames, sequentially buffering the audio frames, determining whether the audio frames are synchronized with the video frames, and adjusting a playback time of the video frames based on a playback time of the audio frames if it is determined that the audio frames are not synchronized with the video frames.

BRIEF DESCRIPTION OF THE DRAWINGS

The above and/or other aspects will be more apparent from the following description of exemplary embodiments taken in conjunction with the accompanying drawings, in which.

DETAILED DESCRIPTION OF EXEMPLARY EMBODIMENTS

Reference will now be made in detail to the exemplary embodiments with reference to the accompanying drawings.

The following detailed description includes specific details in order to provide a thorough understanding of the exemplary embodiments. However, it will be apparent to those skilled in the art that the exemplary embodiments may be practiced without such specific details.

In a related art synchronization playback method for multimedia data of a mobile terminal, if system clock resolution or a playback rate of a server is not identical to that of the mobile terminal, an audio skipping or discontinuity phenomenon occurs. In an exemplary embodiment, an apparatus and method for playing back audio adapted to characteristics of a corresponding mobile terminal and adjusting video playback timing in synchronization with audio playback timing are provided to address this problem in the related art.

Figure 1:
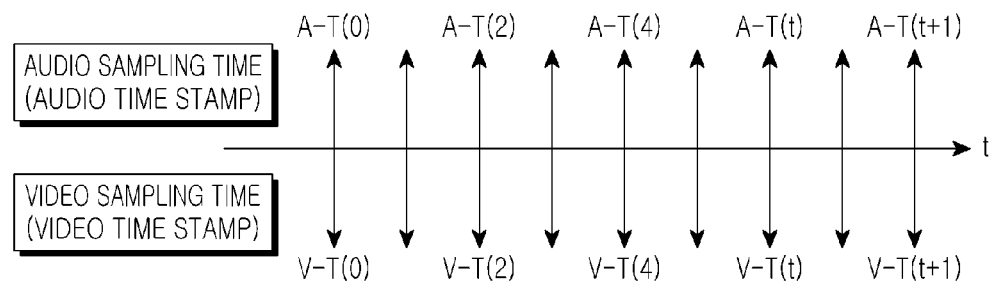
FIG. 1 is a diagram illustrating audio and video time stamps generated by a server according to a related art method.
Figure 2:
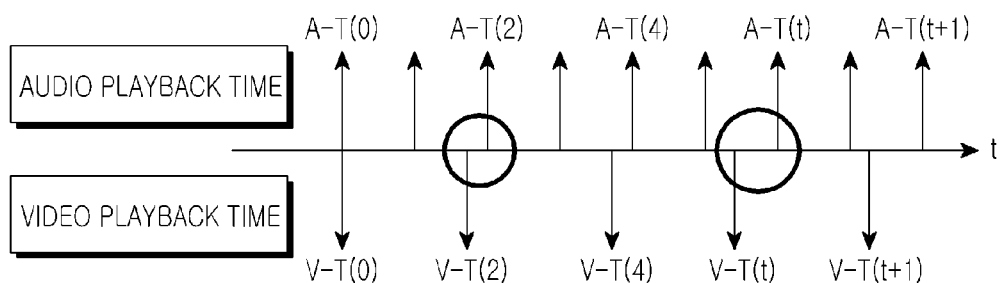
FIG. 2 is a diagram illustrating audio and video time stamps received by a mobile terminal from a server according to a related art method.
Figure 3:
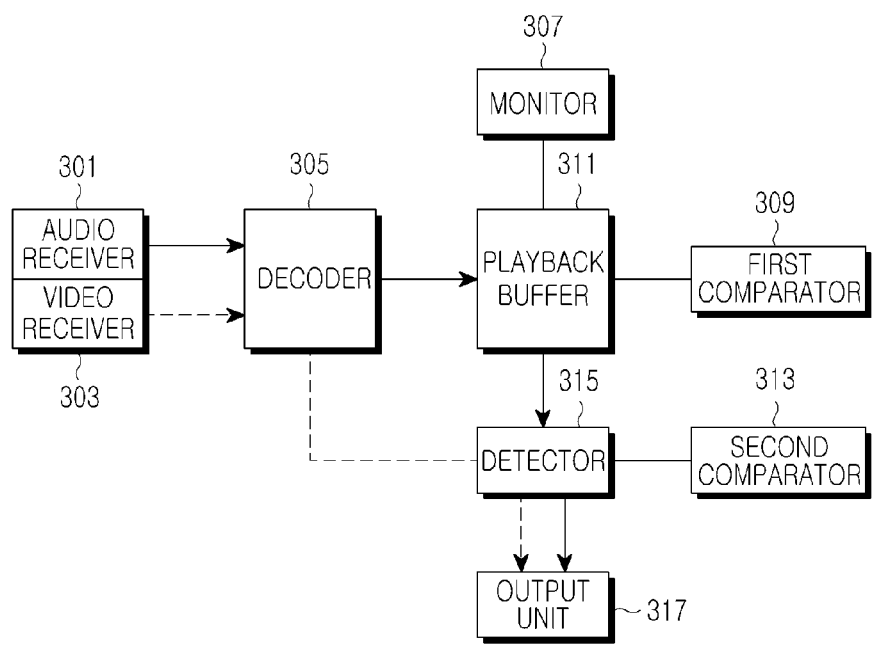
FIG. 3 is a block diagram illustrating an internal configuration of a mobile terminal receiving audio and video time stamps from a server according to an exemplary embodiment.

FIG. 3 is a block diagram illustrating an internal configuration of a mobile terminal receiving audio and video time stamps from a server according to an exemplary embodiment. The mobile terminal includes an audio receiver 301, a video receiver 303, a decoder 305, a monitor 307, a first comparator 309, a playback buffer 311, a detector 315, a second comparator 313, and an output unit 317.

The audio and video receivers 301 and 303 receive audio and video playback data, respectively, from a server (not shown). The server divides the audio and video playback data into units of frames and sets audio and video sampling time information to time stamps so as to be included in frames. The server then encodes the frames and conveys the encoded frames in an RTP payload to transmit the frames to the mobile terminal. The mobile terminal receives the frames within the RTP payload.

The decoder 305 decodes the encoded audio and video frames received from the audio and video receivers 301 and 303. The monitor 307 checks the number of decoded audio frames transmitted to the playback buffer 311. The playback buffer 311 sequentially receives the decoded audio frames and buffers the audio frames in the order they were received.

The first comparator 309 compares the number of audio frames calculated through the monitor 307 with a preset threshold value. If the number of audio frames buffered in the playback buffer 311 is greater than the preset threshold value, this means that additional buffering is not needed. The first comparator 309 informs the playback buffer 311 that there is no need to perform buffering. The playback buffer 311 enters a standby state without receiving audio frames until the number of buffered audio frames becomes less than the preset threshold value. If the number of buffered audio frames is less than the preset threshold value, this indicates that additional buffering is needed and the playback buffer 311 continues to receive audio frames.

The detector 315 calculates a playback time from a first playback frame to a current playback frame, using time stamps contained in the audio frame received from the playback buffer 311 and in the video frame received from the decoder 305. The detector 315 synchronizes the audio and video frames and transmits the synchronized audio and video frames to the output unit 317. In this case, the detector 315 may calculate respective playback times of the audio and video frames.

The second comparator 313 compares the playback times of the audio and video frames detected in the detector 315 with each other. If a difference value between the respective playback times is less than the preset threshold value, the second comparator 313 judges that the audio and video frames are synchronized with each other and transmits a synchronization match signal to the detector 315. If the difference value is greater than the preset threshold value, the second comparator 313 transmits a synchronization error signal to the detector 315.

A reference for synchronization is a playback time of audio frames which have been played up to a current time. The detector 315 minutely adjusts a playback time of video frames to establish audio and video synchronization. The output unit 317 generates audio and video frames depending on a comparison result of the second comparator 313. Audio is output through an audio output unit (not shown) such as a speaker and video is output through an image output unit (not shown) such as a liquid crystal display (LCD). A process for synchronizing audio and video frames will be described herein below with reference to the above-described configuration.

Figure 4:
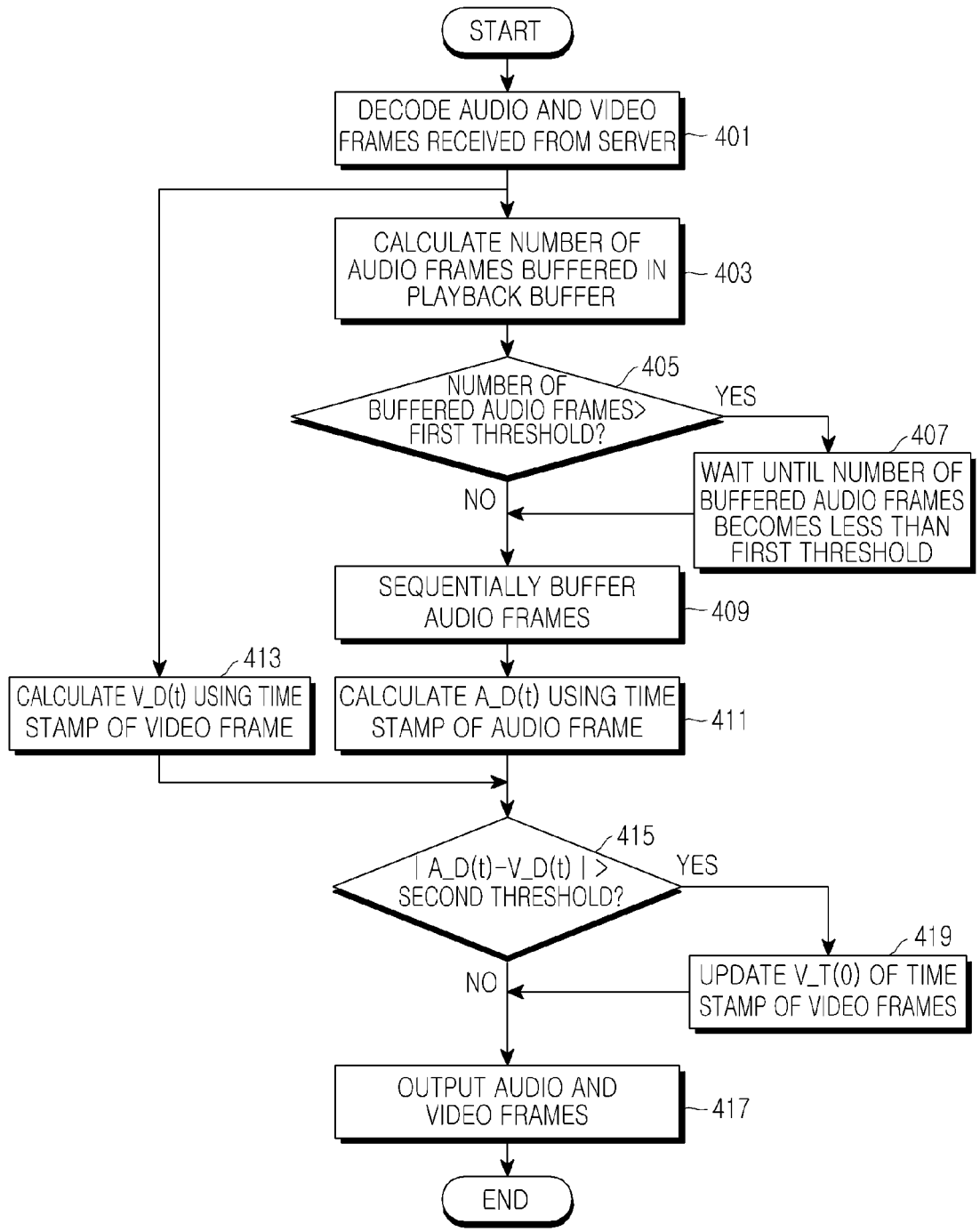
FIG. 4 is a flow chart illustrating an audio and video synchronization process according to an exemplary embodiment.

FIG. 4 is a flow chart illustrating an audio and video synchronization process according to an exemplary embodiment.

A mobile terminal decodes audio and video frames received from a server (operation 401). The decoded audio and video frames include time stamps containing audio sampling time information. The mobile terminal sequentially transmits the decoded audio frames to a playback buffer which buffers the decoded audio frames. In this exemplary embodiment, to prevent buffer overload, the mobile terminal checks the number of audio frames buffered in the playback buffer in units of a predetermined time (operation 403). The mobile terminal compares the number of buffered audio frames with a first preset threshold value (operation 405). If the comparison indicates that the number of buffered audio frames is greater than the first preset threshold value (operation 405—YES), additional buffering is not needed and the mobile terminal enters a standby state without performing additional buffering until the number of buffered audio frames becomes less than the first preset threshold value (operation 407). If the comparison indicates that the number of buffered audio frames is less than the first preset threshold value (operation 405—NO), additional buffering is needed and the mobile terminal continues to receive and buffer audio frames (operation 409).

The mobile terminal calculates a playback time $A\_D(t)$ of audio frames from a time stamp of a first played audio frame in a synchronized state to a time stamp of a currently played audio frame in order to establish synchronization with the video frames (operation 411). Namely, the playback time $A\_D(t)$ represents an elapsed time from a first played audio frame in a synchronized state to a currently played audio frame.

The video frames decoded in operation 401 are used to calculate a playback time $V\_D(t)$ of video frames from a time stamp of a first played video frame to a time stamp of a currently played video frame in order to establish synchronization with the audio frames (operation 413). Namely, the playback time $V\_D(t)$ represents an elapsed time from a first played video frame in a synchronized state to a currently played video frame.

The mobile terminal compares a difference value between the playback times $A\_D(t)$ and $V\_D(t)$ obtained in operations 411 and 413 with a second preset threshold value (operation 415). If the comparison indicates that the difference value between $A\_D(t)$ and $V\_D(t)$ is less than the second preset threshold value (operation 415—NO), the mobile terminal judges that the audio and video frames are synchronized with each other and outputs audio and video playback data at a preset time (operation 417). If the comparison indicates that the difference value between $A\_D(t)$ and $V\_D(t)$ is greater than the second preset threshold value (operation 415—YES), the mobile terminal corrects the time stamp of the video frames by minute adjustment to synchronize the audio and video playback data (operation 419).

Since a V_T(t) value received in real time cannot be changed, a V_T(0) value which is a first played start time value is minutely adjusted in a synchronized state. Even if the value V_T(0) is changed, the changed V_T(0) does not affect the difference value between A_D(t) and V_D(t) because it has already been used. That is, video playback timing may be synchronized with audio playback timing by minutely adjusting the used V_T(0) value.

As illustrated in FIGS. 3 and 4, it may be appreciated that a process for monitoring the number of audio frames buffered in the playback buffer is added unlike a case of video frames. Since audio is consecutive data, a constant number of audio frames should always be maintained in the playback buffer in order to prevent a discontinuity phenomenon. However, since video is not consecutive data, there is no need to maintain video frames in the playback buffer and playback only at a corresponding time is required.

A method for minutely adjusting the V_T(0) value may be performed according to Equation 1 as follows.

$$A\_D(t)=A\_T(t)-A\_T(0)$$

$$V\_D(t)=V\_T(t)-V\_T(0)$$

$$\text{if } V\_D(t) > A\_D(t), \text{ then } V\_T(0)=V\_T(0)+D$$

$$\text{if } V\_D(t) < A\_D(t), \text{ then } V\_T(0)=V\_T(0)-D \quad \text{[Equation 1]}$$

In Equation 1, D may be defined as a timing control value and is very small relative to V_T(0). During adjustment of video playback timing, if the timing is abruptly changed, intervals between video playback frames become greatly different and video playback may not be smoothly performed. Therefore, the timing control value D has a small value relative to V_T(0).

Figure 5:
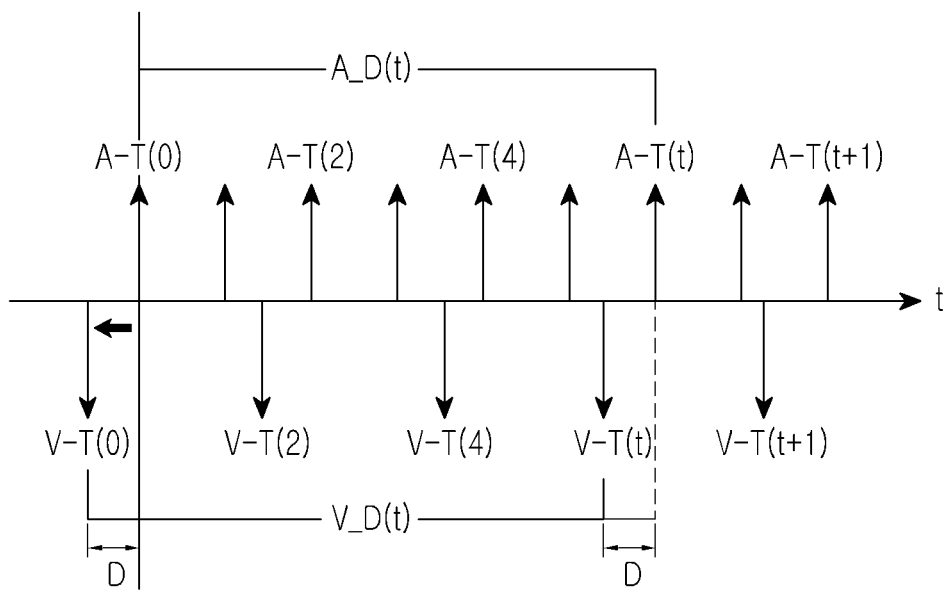
FIG. 5 is a diagram illustrating adjustment of a start time of a first frame of video for accurate synchronization with audio according to an exemplary embodiment.

FIG. 5 is a diagram illustrating adjustment of a start time of a first frame of video for accurate synchronization with audio according to an exemplary embodiment. In FIG. 5, since an A_D(t) value is greater than a V_D(t) value, a V_T(0) value may be minutely adjusted by subtracting a timing control value D corresponding to a difference value between A_D(t) and V_D(t) and therefore audio and video may be synchronized. Although not shown in FIG. 5, if the A_D(t) is less than the V_D(t), the V_T(0) value may be minutely adjusted by adding a timing control value D corresponding to a difference value between A_D(t) and V_D(t).

According to the exemplary embodiments, synchronization of video playback timing with audio playback timing while audio is played is determined based on a playback rate of a mobile terminal without using a time stamp received from a server. Therefore, synchronized audio and video may be played without audio skipping or discontinuities.

The configuration and operation of the audio and video synchronization apparatus and method according to the exemplary embodiments may be achieved as described above. Although the exemplary embodiments have been disclosed for illustrative purposes, various modifications, additions and substitutions are possible, without departing from the scope and spirit of the invention as defined in the accompanying claims. Accordingly, the scope of the present invention should not be limited to the description of the exemplary embodiments, but defined by the accompanying claims and equivalents thereof.

What is claimed is:

1. An apparatus for synchronizing audio and video in a wireless communication network, the apparatus comprising:
a receiver that receives audio frames and video frames via the wireless communication network;
a playback buffer that sequentially buffers the audio frames on a frame by frame basis and separately from the video frames; and
a detector that determines whether the audio frames received from the wireless communication network are synchronized with the video frames received from the wireless communication network, by comparing a playback time of the audio frames received from the playback buffer and a playback time of the video frames received from the receiver, and adjusts a playback time of the video frames based on a time from a first played audio frame which is played in a synchronized state to a time of a currently played audio frame, when it is determined that the audio frames are not synchronized with the video frames.

2. The apparatus according to claim 1, further comprising a decoder which receives the audio and video frames from the receiver, decodes the audio and video frames, and outputs the decoded audio and video frames to the playback buffer.

3. The apparatus according to claim 1, further comprising:
a monitor checks a number of audio frames buffered in the playback buffer on a frame by frame basis and separately from the video frames; and
a first comparator that compares the number of buffered audio frames calculated through the monitor with a first threshold value.

4. The apparatus according to claim 3, wherein the playback buffer controls reception of the audio frames based on a result of the calculation by the monitor and a result of the comparison by the first comparator, so that the number of buffered audio frames is maintained to be less than the first threshold value.

5. The apparatus according to claim 1, wherein the detector determines a playback time of audio frames from a start time of audio frames played in a first synchronized state to a current time, and determines a playback time of video frames from a start time of video frames played in a first synchronized state to a current time, in order to determine whether the audio frames are synchronized with the video frames.

6. The apparatus according to claim 5, further comprising a second comparator that compares a difference value between the determined playback time of the audio frames and the determined playback time of the video frames with a second threshold value.

7. The apparatus according to claim 6, wherein the detector does not adjust the playback time of the video frames if the difference value is less than the second threshold value, and adjusts the playback time of the video frames to be synchronized with the playback time of the audio frames if the difference value is greater than the second threshold value.

8. The apparatus according to claim 5, wherein the detector synchronizes the audio and video frames by identically setting elapsed times of the audio and video frames by minute adjustment of a start time of the video frames.

9. A method for synchronizing audio and video in a wireless communication network, the comprising:
receiving audio frames and video frames via the wireless communication network;
sequentially buffering the audio frames on a frame by frame basis and separately from the video frames;
determining whether the audio frames received from the wireless communication network are synchronized with the video frames received from the wireless communication network, by comparing a playback time of the buffering audio frames and a playback time of the received video frames;

adjusting a playback time of the video frames based on a time from a first played audio frame which is played in a synchronized state to a time of a currently played audio frame, when it is determined that the audio frames are not synchronized with the video frames.

10. The method according to claim 9, wherein the sequentially buffering the audio frames on a frame by frame basis comprises:

checking a number of buffered audio frames;

comparing the number of buffered audio frames with a first threshold value; and buffering the audio frames on a frame by frame basis so that the number of buffered audio frames is maintained to be less than the first threshold value.

11. The method according to claim 9, wherein the determining whether the audio frames are synchronized with the video frames comprises:

determining a playback time of audio frames played from a reference time started in a first synchronized state to a current time;

determining a playback time of video frames played from a reference time started in a first synchronized state to a current time; and comparing calculating a difference value between the determined playback time of audio frames and the determined playback time of the video frames with a second threshold value in order to determine whether the audio frames are synchronized with the video frames.

12. The method according to claim 11, further comprising:

determining that the audio frames are synchronized with the video frames if the difference value is less than the second threshold value; and determining that the audio frames are not synchronized with the video frames if the difference value is greater than the second threshold value.

13. The method according to claim 9, wherein the adjusting the playback time includes synchronizing the audio and video frames by identically setting elapsed times of the audio and the video frames by minutely adjusting a reference value of the video frames so as to play back the video frame at a same time as the playback time of the audio frames.

14. The method according to claim 13, wherein the reference value is a start time of video frames played in a first synchronized state.

15. A method for synchronizing audio and video playback in a terminal, comprising:

receiving audio frames and video frames via a wireless communication network;

detecting whether the audio frames received from the wireless communication network are synchronized with the video frames received from the wireless communication network, by comparing a playback time of the audio frames and a playback time of the video frames;

adjusting the a playback time of the video frames to correspond to a time from a first played audio frame which is played in a synchronized state to a time of a currently played audio frame, so that the audio frames and video frames are synchronized; and playing the synchronized video frames and audio frames on the terminal.

16. The method of claim 15, further comprising sequentially buffering the audio frames on a frame by frame basis and separately from the video frames prior to the detecting whether the audio frames are synchronized with the video frames.

17. The method of claim 16, further comprising comparing a number of buffered audio frames with a first threshold value, and ceasing to buffer additional audio frames if the number of buffered frames exceeds the first threshold value.

18. The method of claim 17, further comprising determining a difference value between the video playback time and audio playback time, and adjusting the video playback time if the difference value exceeds a second threshold value.

\* \* \* \* \*